United States Patent [19]

Gregerson

[11] 4,083,142
[45] Apr. 11, 1978

[54] ANIMAL SNARE

[76] Inventor: Keith J. Gregerson, Roundup, Mont.

[21] Appl. No.: 733,767

[22] Filed: Oct. 19, 1976

[51] Int. Cl.² ............................................. A01M 23/34
[52] U.S. Cl. ........................................ 43/87; 119/153
[58] Field of Search ................. 43/87, 44.83; 119/153, 119/106; 294/74

[56] References Cited

U.S. PATENT DOCUMENTS

| | | | |
|---|---|---|---|
| 1,738,907 | 12/1929 | Kleffman | 43/87 |
| 2,683,952 | 7/1954 | Armstrong | 43/87 |
| 3,754,347 | 8/1973 | McGahee | 43/44.83 |

Primary Examiner—William Pieprz
Attorney, Agent, or Firm—Arthur L. Urban

[57] ABSTRACT

An animal snare comprising a length of multiwire, multibundle steel cable, a wire swivel with a wound section disposed about one end of said cable, a metal washer substantially the same outer diameter as said wound section of said swivel positioned on said cable between the wound section of said swivel and the end of said cable, a lock having openings through which said cable is threaded, said lock comprising a bent strip with two sections at an acute angle and two openings in each section, one opening in each section being adjacent the bend and substantially the same distance from the bend as the corresponding opening in the other section, and a second opening in each section located a greater distance from the bend and substantially the same distance from the bend as the corresponding second opening in the other section, one of said second openings having a diamond shape and the other of said second openings being an elongated slot with a tab extending from the end of the slot closest to the bend toward the second opening of the other section of said bent strip; said cable being threaded first through said second openings with the diamond-shaped opening being closest to the swivel and back through the first openings with the end of the cable extending from the first opening adjacent the diamond-shaped second opening; and the ends of said cable having soldered, deformed, helical spring anchors thereon to secure said lock and said swivel on said cable.

10 Claims, 4 Drawing Figures

ANIMAL SNARE

This invention relates to a novel animal snare and more particularly relates to a unique snare which minimizes losses of snared animals.

The use of snares for capturing animals has increased in recent years as compared with jaw traps, particularly in cold climates. Jaw traps are not reliable where moisture and freezing conditions exist since the traps sometimes freeze tight and do not operate properly. Also, traps are objectionable because they generally catch an animal by a foot which may enable the animal to pull loose leaving a foot in the trap. In addition, jaw traps are not selective in the animal they catch.

Snares have a number of important advantages over jaw traps. They are not significantly affected by weather. Furthermore, they are selective in that the size and height above the ground of the snare loop allows smaller animals to pass under the loop and larger animals to step over the loop. Also, since the animal generally is caught by the neck and choked, the animal expires more quickly. In addition, snares are safer in that dogs or other animals which have been collar trained will not be hurt since they will not struggle to the extent that they choke themselves so they can be released when the trapper checks his snares.

While snares have been successful in the past with animals such as rabbits, they have not been successful with stronger animals such as coyotes, wolves, and other predators. The latter have such great strength and endurance and bone-crushing jaws they can exert tremendous forces on snare components to destroy the snares and free themselves. Snares heretofore available lacked sufficient structural integrity to hold such predators with a high degree of reliability.

The present invention provides a novel snare with a high degree of reliability and success in capturing animals and particularly predators such as coyotes. The snare of the invention is simple in design but is of high structural integrity and can be manufactured in quantity relatively inexpensively.

Other advantages of the invention will be apparent from the following description and the accompanying drawings in which.

Figure 1:
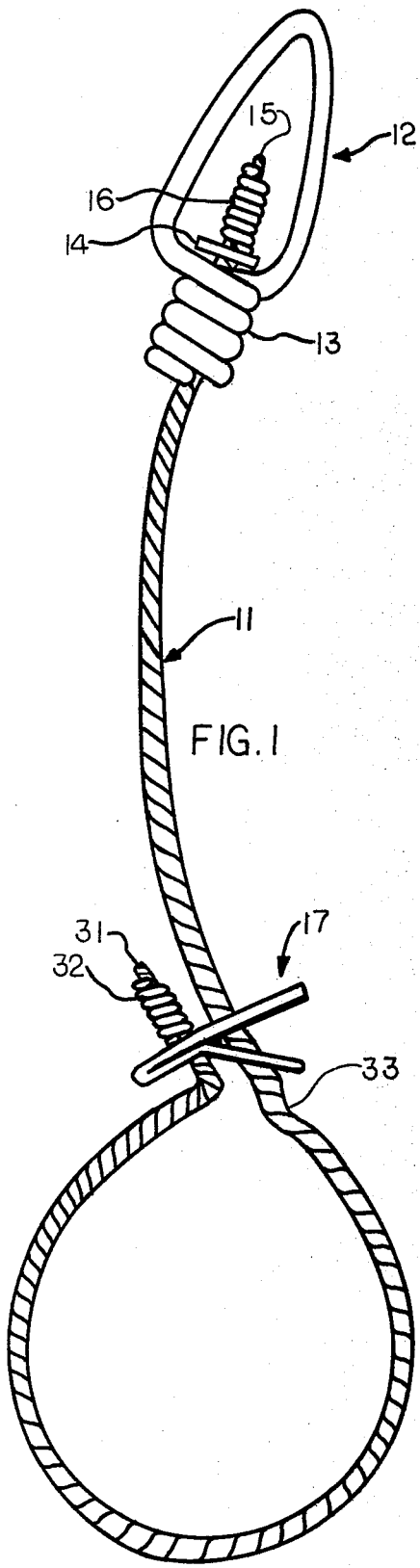
FIG. 1 is a side elevation of one form of animal snare of the present invention.

As shown in the drawings, a snare of the invention includes a length of multiwire, multibundle steel cable 11 which at one end has a wire swivel 12 with a wound section 13. A metal washer 14 of substantially the same outer diameter as the wound section 13 of the swivel 12 is positioned on the cable 11 between the wound section 13 and the end 15 of the cable. A helical spring anchor 16 is secured adjacent the cable end 15. The spring 16 is deformed and soldered to the cable end to insure that the swivel 12 cannot be pulled from the cable.

The cable 11 is threaded through a cable lock 17 which is a bent strip with a number of openings for the cable. The strip is bent to form two sections 19 and 20 at an acute angle, usually between about 30° and 50° and preferably between about 35° and 45°. Each section has two openings, that is, section 19 has openings 21 and 22 and section 20 has openings 23 and 24. Opening 21 in section 19 is substantially the same distance from bend 26 as is opening 23 of section 20. Likewise, opening 22 in section 19 is substantially the same distance from bend 26 as is opening 24 in section 20. Openings 22 and 24 are located a greater distance from bend 26 than openings 21 and 23.

Figure 2:
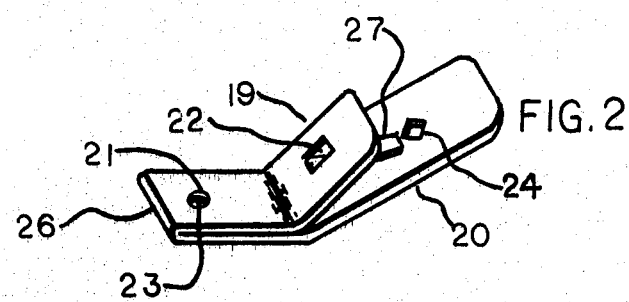
FIG. 2 is an enlarged perspective view of the lock portion of the snare shown in FIG. 1.
Figure 3:
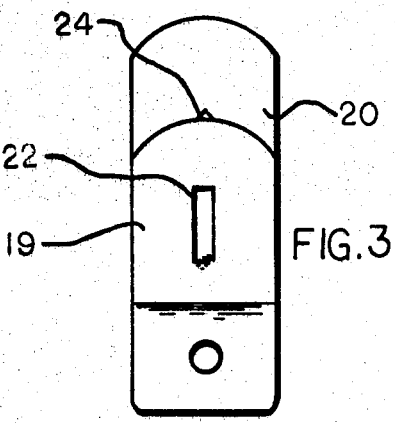
FIG. 3 is a further enlarged top view of the lock portion of the snare shown in FIG. 1.
Figure 4:
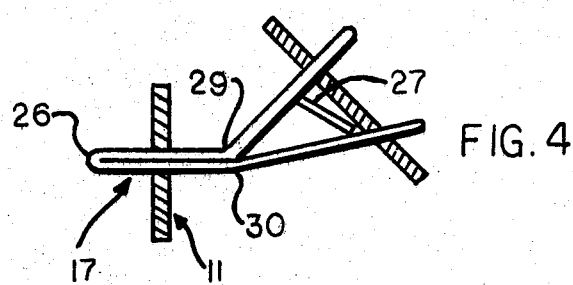
FIG. 4 is an enlarged side elevation of the lock portion of the snare shown in FIG. 1.

As shown in FIGS. 2-4, opening 24 is of a diamond shape, while opening 22 is an elongated slot with a tab 27 which extends from the end of the slot closest to opening 21. Advantageously, tab 27 is of sufficient length to substantially span the distance between opening 22 and opening 24. It is desirable that the end of tab 27 be adjacent the edge of opening 24 which is closest to opening 23.

In a preferred form of lock 17 as shown in FIGS. 2-4, sections 19 and 20 each have a bend 29 and 30, respectively. These bends are located closer to openings 21 and 23 than they are to openings 22 and 24. The bends in sections 19 and 20 result in the portions thereof closest to bend 26 in which openings 21 and 23 are located being substantially parallel. The portion of section 20 beyond bend 30 is bent at an angle, e.g., less than about 10° with respect to the other portion of section 20. The bend 29 in section 19 causes the angle between the sections to remain between about 35° and 45° or 30° and 50° as specified above.

The cable is threaded through the openings of lock 17 as shown in the drawings by first passing the cable through opening 24, then through opening 22 forming a loop and finally back through opening 21 and out opening 23. The end 31 of cable 11 extending from opening 23 has a soldered deformed helical spring anchor 32 similar to anchor 16 to insure that the cable end 31 cannot be pulled from lock 17 which would free a snared animal.

The cable 11 as pointed out above is a multiwire, multibundle steel cable, preferably of the so-called "aircraft type." Advantageously, the cable has at least about the same number of wire bundles as there are individual wires in each bundle. A particularly suitable cable construction has seven wire bundles with seven wires in each bundle. This cable is commercially available as a 7×7 steel cable.

The snare of the present invention as shown in the drawings is used to capture an animal by first forming a loop of a suitable size for the particular animal to be snared by adjusting the position of lock 17 on cable 11. The cable is bent at a point 33 just below the lock 17 to retain the loop in an open position when the wind is blowing. Then, the snare is set along a runway or path normally traveled by the animal. The swivel is secured to a tree or a drag by suitable fastening means such as a wire or a chain to prevent a snared animal from running off with the snare. A distance between the snare and the tree or drag is selected to permit the snare to be suspended an appropriate height above the ground to surround the head of the animal to be snared.

When the animal running along the path inserts his head through the loop of the snare, lock 17 will be drawn along cable 11, closing the loop and tightening the cable about the animal's neck. As the animal struggles, section 19 of lock 17 will be moved toward section 20 and tab 27 will wedge the cable tightly against the edge of diamond-shaped opening 24 securing the position of the lock.

Since swivel 12 is freely rotatable on cable 11 with washer 14 between the wound section 13 of swivel 12 and the deformed spring anchor 16, the struggling of the snared animal will rotate the cable freely with respect to the swivel so that the wire bundles of the cable will not separate which might otherwise occur if the cable were twisted. Separation of the cable bundles may permit the snared animal to bite through the cable and gain freedom.

The above description and drawings show that the present invention provides a novel animal snare which is highly reliable yet is simple in design and relatively inexpensive to manufacture. The snare of the invention has proven very successful in snaring predators and particularly coyotes which are considered one of the most difficult animals to capture.

It will be apparent that various modifications may be made in the snare described in detail above and shown in the drawings within the scope of the invention. For example, the overall size of the swivel and the lock may be changed. Therefore, the invention is to be limited only by the following claims.

What is claimed is:

1. An animal snare comprising a length of multiwire, multibundle steel cable, a wire swivel with a wound section disposed about one end of said cable, a metal washer substantially the same outer diameter as said wound section of said swivel positioned on said cable between the wound section of said swivel and the end of said cable, a lock having openings through which said cable is threaded, said lock comprising a unitary bent strip member with two sections at an acute angle and two openings in each section, one opening in each section being adjacent the bent and substantially the same distance from the bend as the corresponding opening in the other section, and a second opening in each section located a greater distance from the bend and substantially the same distance from the bend as the corresponding second opening in the other section, one of said second openings having a diamond shape and the other of said second openings being an elongated slot with a tab extending from the end of the slot closest to the bend toward the second opening of the other section of said bent strip; said cable being threaded first through said second openings with the diamond-shaped opening being closest to the swivel and back through the both said first openings with the end of the cable extending from the first opening adjacent the diamond-shaped second opening; and the ends of said cable having soldered, deformed, helical spring anchors thereon to secure said lock and said swivel on said cable.

2. An animal snare according to claim 1 wherein the angle between the sections of said lock is between about 30° and 50°.

3. An animal snare according to claim 1 wherein the angle between the sections of said lock is between about 35° and 45°.

4. An animal snare according to claim 2 wherein each section of said lock has an additional bend between said first and second openings.

5. An animal snare according to claim 4 wherein said additional bends in said sections are closer to said first openings than said second openings.

6. An animal snare according to claim 4 wherein the portions of said sections in which said first openings are located are substantially parallel.

7. An animal snare according to claim 6 wherein the angle of the bend in the section with the diamond-shaped second opening is less than 10° and the angle between the sections beyond the bends is between about 35° and 45°.

8. An animal snare according to claim 1 wherein said cable has at least about the same number of wire bundles as there are wires in each bundle.

9. An animal snare according to claim 1 wherein said cable has seven wire bundles with seven wires in each bundle.

10. An animal snare according to claim 1 wherein the tab extending from a second opening in said lock is of sufficient length to substantially span the distance between the second openings in the respective sections.

* * * * *